US009420097B2

(12) United States Patent
Perotti et al.

(10) Patent No.: US 9,420,097 B2
(45) Date of Patent: Aug. 16, 2016

(54) AUTOMATED TRAVERSAL OF INTERACTIVE VOICE RESPONSE SYSTEMS

(71) Applicant: Plantronics, Inc., Santa Cruz, CA (US)

(72) Inventors: Erik Perotti, Santa Cruz, CA (US); Cary Bran, Seattle, WA (US); Barry L Margerum, Santa Cruz, CA (US)

(73) Assignee: Plantronics, Inc., Santa Cruz, CA (US)

( * ) Notice: Subject to any disclaimer, the term of this patent is extended or adjusted under 35 U.S.C. 154(b) by 5 days.

(21) Appl. No.: 14/169,019

(22) Filed: Jan. 30, 2014

(65) Prior Publication Data

US 2015/0215455 A1    Jul. 30, 2015

(51) Int. Cl.
 *H04M 1/64* (2006.01)
 *H04M 3/493* (2006.01)
 *H04M 11/00* (2006.01)

(52) U.S. Cl.
 CPC .......... *H04M 3/493* (2013.01); *H04M 2201/40* (2013.01)

(58) Field of Classification Search
 CPC .................. H04M 1/274566; H04M 2201/14; H04M 2203/2016; H04M 3/4217; H04M 3/493
 USPC .............................. 379/88.01–88.19; 704/231
 See application file for complete search history.

(56) References Cited

U.S. PATENT DOCUMENTS

| 8,515,028 B2 | 8/2013 | Berger et al. | |
| 2009/0003543 A1* | 1/2009 | Altberg | H04M 3/42 379/88.13 |
| 2009/0154666 A1* | 6/2009 | Rios | G06F 3/04895 379/88.18 |
| 2010/0296638 A1* | 11/2010 | Wang | H04M 3/4217 379/88.04 |
| 2015/0030143 A1* | 1/2015 | Bhogal | H04M 3/5166 379/88.18 |

OTHER PUBLICATIONS

Benway et al., "System and Method for Creating Interactive Voice Response (IVR) Dialers," Utility U.S. Appl. No. 14/201,549, filed Mar. 7, 2014, 69 pages.

* cited by examiner

*Primary Examiner* — Solomon Bezuayehu
(74) *Attorney, Agent, or Firm* — Chuang Intellectual Property Law (57) ABSTRACT

Methods and apparatuses for interactive voice response system traversal are disclosed. In one example, a user selectable dialer is created including a dial number for an interactive voice response (IVR) system and an ordered sequence of IVR response data operable to transmit to the IVR system perform a desired operation. A user selection of the user selectable dialer is received, and the dial number is automatically dialed to connect to the IVR system and the ordered sequence of IVR response data is automatically transmitted to perform the desired operation.

29 Claims, 6 Drawing Sheets

AUTOMATED TRAVERSAL OF INTERACTIVE VOICE RESPONSE SYSTEMS

BACKGROUND OF THE INVENTION

Many companies now employ interactive-voice-response (IVR) systems to handle incoming calls. IVR systems typically answer telephone calls and present to the callers a series of audible menus of selectable options. Callers make menu selections by either depressing a keypad key to transmit a dual tone multi-frequency (DTMF) tone or speaking a response or command understood by the IVR system. Following user selection of a menu item, a new menu of selectable items may be presented based on the prior selection. In order to reach a desired location within the IVR system or perform a particular operation, the user may be required to listen to and select from several levels of menus. IVR systems have become ubiquitous as companies can reduce operating costs by using IVR systems to reduce the number of human operators required to handle incoming calls. Modern IVR systems allow a user to perform a variety of operations without the need to ever speak to a human operator.

However, from the caller's perspective, interaction with IVR systems tends to be a frustrating process. The primary complaint is the time required to listen to lengthy menus and the number of levels of menus which must be navigated to perform a desired operation. Users may be particularly frustrated when a user simply desires to talk to a human operator and the IVR system is of sufficient complexity that it is difficult to reach a human operator, requiring the user to waste time navigating the menu hierarchy system. Where a menu is particularly lengthy, the user may not remember all of the options and may often need to repeat the entire menu. If a user makes an incorrect selection, the user must backtrack to the prior menu. In cases where the IVR systems requests the user input information such as an account number, the user may not have the information handy or may incorrectly input the information.

As a result, improved methods and apparatuses for navigating interactive voice response systems are needed.

BRIEF DESCRIPTION OF THE DRAWINGS

The present invention will be readily understood by the following detailed description in conjunction with the accompanying drawings, wherein like reference numerals designate like structural elements.

DESCRIPTION OF SPECIFIC EMBODIMENTS

Methods and apparatuses for traversing interactive voice response (IVR) systems are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein.

Block diagrams of example systems are illustrated and described for purposes of explanation. The functionality that is described as being performed by a single system component may be performed by multiple components. Similarly, a single component may be configured to perform functionality that is described as being performed by multiple components. For purpose of clarity, details relating to technical material that is known in the technical fields related to the invention have not been described in detail so as not to unnecessarily obscure the present invention. It is to be understood that various example of the invention, although different, are not necessarily mutually exclusive. Thus, a particular feature, characteristic, or structure described in one example embodiment may be included within other embodiments unless otherwise noted.

In one example, a method includes creating a user selectable dialer comprising a dial number for an interactive voice response system and an ordered sequence of IVR response data operable to transmit to the IVR system perform a desired operation. The method further includes receiving a user selection of the user selectable dialer, and automatically dialing the dial number to connect to the IVR system and automatically transmitting the ordered sequence of IVR response data to perform the desired operation.

In one example, one or more non-transitory computer-readable storage media have computer-executable instructions stored thereon which, when executed by one or more computers, cause the one more computers to perform operations including receiving a dial number associated with a contact entity utilizing an interactive voice response system. The operations include receiving an ordered sequence of IVR response data operable to transmit to the IVR system to perform a desired operation at the contact entity, and creating a user selectable contact entity dialer including the dial number and the ordered sequence of IVR response data. The operations further include receiving a user selection of the user selectable contact entity dialer, and automatically dialing the dial number and automatically utilizing the ordered sequence of IVR response data to interact with the IVR system to perform the desired operation.

In one example, one or more non-transitory computer-readable storage media have computer-executable instructions stored thereon which, when executed by one or more computers, cause the one more computers to perform operations including creating a user selectable dialer comprising a dial number for an interactive voice response system and IVR response data operable to transmit to the IVR system perform a desired operation. The operations include receiving a user selection of the user selectable dialer. The operations further include automatically dialing the dial number to connect to the IVR system and automatically transmitting the IVR response data to perform the desired operation responsive to receiving the user selection.

In one example, methods and systems are described which advantageously allow for one-tap dialing into corporate IVR systems to either complete a desired task or reach a desired destination within an IVR system. For example, a user can utilize a dialer that allows her to one-tap dial into her bank, to transfer funds, talk to someone, check her account balance, or perform other desired operations. In certain embodiments, the dialer may utilize data which is highly sensitive. In these embodiments, methods and systems are provided for securing personal data. In one example, a dialer is a string of numbers and pauses that can be passed to a phone application on an iOS, WindowsPhone, Android, and/or Windows-based PC.

In one example simplified operation, a user downloads the application to one or more of her devices. She does a search for a dialer on her newly installed application on her computing device, such as a smartphone. She then subscribes to the dialer. If the dialer requires personal information, she adds it after creating a password. She taps, 'dial now' and it performs the task. If she opens another device, and it knows it's the same person, her second client inherits the dialer subscriptions. If a dialer does not exist, she creates it. Thus, a corporate contact is created with advanced configuration for the dialing. Created dialers may be stored in the cloud and downloaded to user client devices utilizing a variety of platforms.

Created dialers may vary in complexity. For example, a dialer may be literal:

dial 1831-458-7550 WAIT 3 seconds, then dial 236242#

In this example, the dialer is to automatically dial into a conference call and automatically enter the conference identification number.

Dialers may also be more like a template:

dial 1831-458-7550 WAIT 3 seconds, then dial 236242# then WAIT 3 seconds, then dial User's security PIN to join User as the moderator, then dial #, then WAIT 3 seconds, then dial # again to start the meeting In this example, the dialer is to automatically dial into a conference call, automatically enter the conference identification number, and then automatically enter a security PIN to join the caller as the moderator. In this usage scenario, the template is the same for all meetings, but the moderator PIN is unique to each person, and private. In one example, portions of the dialer which are public may be stored on a device remote from a user computing device and portions of the dialer which are private information (e.g., the user PIN) are stored on the user computing device itself. When the dialer is executed, the public information and private information are dynamically assembled and integrated. For example, the dialer includes a data field for a user PIN, and when executed, the dialer retrieves the user PIN from the user computing device. In one example, dialers may utilize SIP addresses and WebRTC signaling in addition to telephone numbers.

Dialers which are available to users may be created in a variety of ways. In one example, dialers are created using crowd-sourcing techniques. In a further example, an enterprise may create dialers for its own IVR system and make the dialers available to its customers/users. In a further example, a spidering application may generate dialers by automatically mapping/parsing IVR systems. In a further example, a particular individual is utilized to seed dialers and/or verify the accuracy of created dialers.

In one example, dialers may be created using dialer cloning to add nodes (leaves or branches) to a specific IVR system's tree and asking the user what additional option should be added. For example, a user may create a bank 'transfer funds' dialer. The dial in number and account information for this dialer may be reused in creating a 'talk to a human' at the bank dialer. For the administrator, this provides the ability to map out IVR systems with probabilities of accuracy (based on crowd-sourced feedback), this knowledge being fundamental to gesture-based dialing, voice dialing, etc.

In one example, dialers may include contextually appropriate voice prompts which are transmitted to an IVR system. For example, a dialer may pass the voice command 'yes' to the IVR system, and store this as part of the record to dial Bank of America's customer service department. In one example, the voice prompt is a recording of the user voice.

In certain examples, some of the user data to be transmitted to the IVR system is private information or confidential. For example, if the user wants to create a dialer that connects the user to her account with her bank, it is necessary to safely store the account number as part of her bank dialer. The confidential data may be encrypted and accessible through a two-factor authentication system. For example, the user may create a dialer for her bank 'transfer funds' task, and store her savings and checking accounts numbers. Once initially created, the user would need to provide a secret passcode in order to dial her bank using this dialer.

In one example, updated dialers are made available to the user. The user may be notified when there is an updated dialer when the IVR system for a given dialer changes, e.g., when the menu options change. In one example, the updated dialer may automatically be downloaded to the user to replace a current dialer. In one embodiment, the system may provide some scoring or other means of providing feedback to users about the likelihood of success for a dialer, and allow for edits to the dialer by some trusted members of the user community (paid moderators, for example).

In one example, users can easily find existing dialers. For example, if it is determined that banks have 'talk to a human' as some leaf node, the taxonomy learns what tasks a user typically does with an IVR system within a specific industry. For example, the structure may be industry>business>dialer action, but this is subject to change as feedback is received from end-users. The user, therefore, can search for his or her bank, and then scan existing tasks. This is important because with user-generated content, it is advantageous that other community members can easily find what they are looking for or they will create a duplicate record. So, the system utilizes common terms like 'call customer service' and 'transfer funds' that can be reused within and across industries. In one example, a template by which a business owner can create the 'official' dialer for her organization is provided.

In one example, the last segment of a call is recorded and provided to the user as the operation conclusion. This enables the user to confirm that the desired operation was performed correctly and what the conclusion of the desired operation was without needing to listen to the entire duration of the call during the automated IVR system traversal.

In one example, the call duration is estimated from the IVR response data. For example, the pauses between automated button presses are accounted for. Based on the estimated time to perform the desired operation, the system automatically stops (i.e., hangs up) the call when that amount of time has passed, and the last segment of the call is recorded for the user to review at her convenience. For example, the last 20-25 seconds of the call are recorded.

In one example, a state machine is utilized to determine when to terminate the call and which portion of the call to record. Utilizing the IVR response data, the system knows which step the IVR system is currently performing, records the audio corresponding to execution of the last step, and terminates the call at the end of that last step.

In one example, the entire call is recorded. Following completion of the call, only a pre-determined end portion of the call is clipped and saved, with the beginning portion of the call discarded. For example, the last 20-25 seconds of the call are clipped and saved.

The call can be recorded and saved as a digital audio file either locally (on the end-user's mobile device) or in the cloud. In either embodiment, the call can be recorded in its entirety, clipped, and then played back to the user. In one example, the recording is also transcribed and returned to the user as text using a speech-to-text engine. For example, the text can be displayed to the user on a mobile phone display and/or sent to the user via electronic communication.

In one example, methods and apparatuses are provided for leveraging data from other applications to automatically dial into an IVR system. When one dials into an IVR system, there are a number of items that are already known elsewhere in the device that could leveraged as automatic input to an IVR system. Such items may include, for example, current location zip code, device owner name, device owner phone number, and device language. This information is automatically input an IVR system, saving users the step of manually entering this information. For example, the user phone number may automatically be transmitted to the IVR system as IVR response data in response to an IVR system question "Please enter the phone number associated with your account." The automatic entry saves time and users do not have to change modes for voice-based actions. In one example, information (e.g., personal data) retrieved or received for one dialer may be automatically utilized by other dialers. For example, if the user enters her social security number (SSN) for dialer 1, she is able to enable its automatic use for dialer 2 provided she approves this cross-IVR data sharing.

Figure 1:
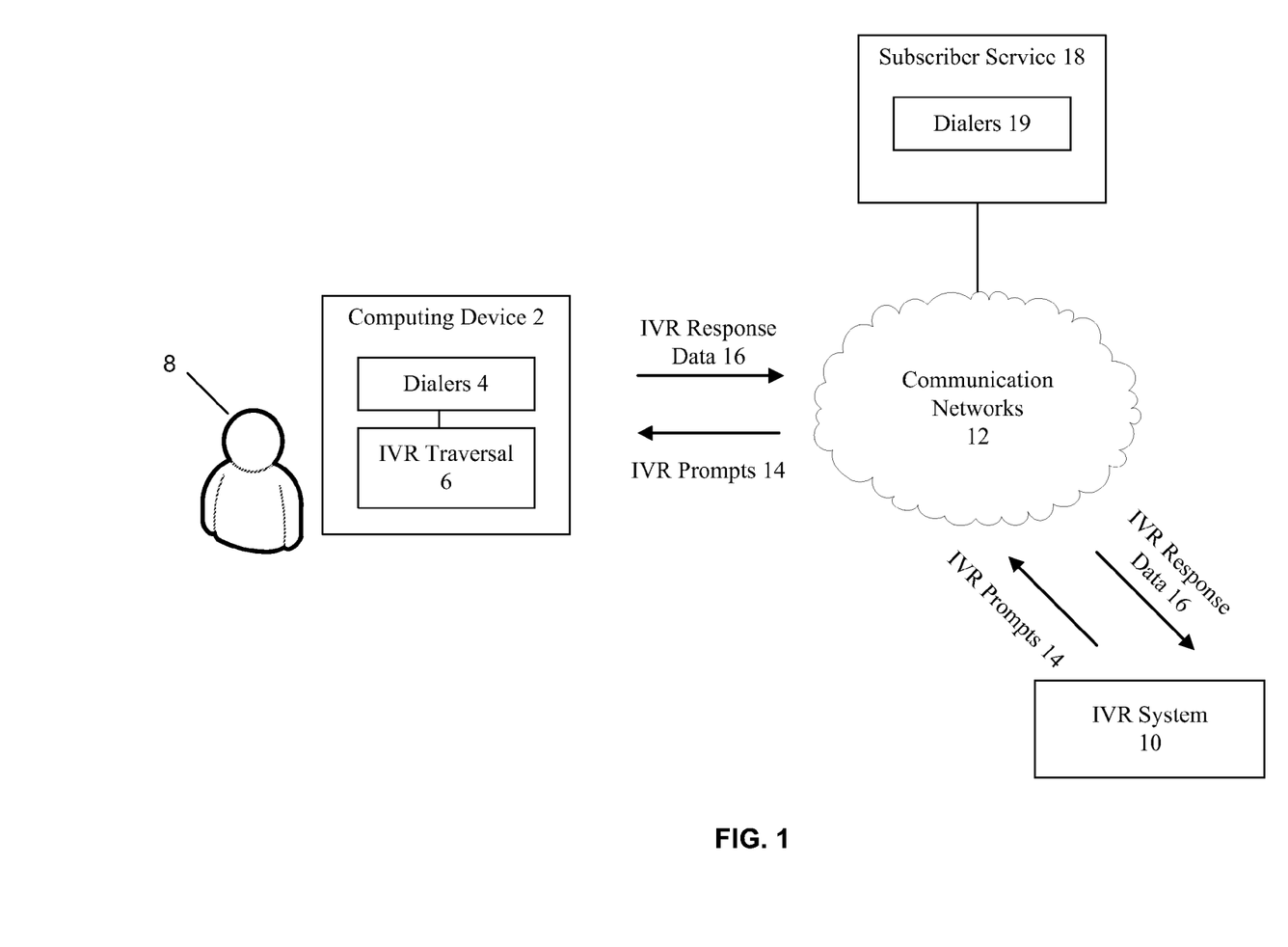
FIG. 1 illustrates a system for auto-traversal of an interactive voice response system in one example.

FIG. 1 illustrates auto-traversal of an IVR system 10 using a computing device 2. In FIG. 1, computing device 2 executes an IVR traversal application 6 interfacing with one or more dialers 4. In one example, dialers 4 are received from a subscriber service 18 operating on a remote computing device storing a plurality of dialers 19. In a further example, dialers 4 may be created by the user at computing device 2. In a further example, IVR traversal application 6 and dialers 4 may reside on a remote device accessible by computing device 2.

Referring to FIG. 1, in operation, a user 8 wishing to perform a desired operation at IVR system 10 selects the appropriate dialer from dialers 4 at computing device 2. Computing device 2 initiates a call to the dial number for the selected dialer via communication networks 12, in this example, the dial number for IVR system 10. In one example, the call is a mobile phone call placed over a wireless communications network. In one example, the call is a VoIP phone call placed over an IP communications network such as the Internet. Communication networks 12 may be any combination of communication networks capable of carrying data, including a PSTN, a wireless telecommunication provider network, the Internet, a Local Area Network (LAN), Wide Area Network (WAN), or Internet Protocol (IP) network implementing VoIP.

Once the call is connected with IVR system 10, IVR traversal application 6 at computing device 2 interacts with IVR system 10 to automatically perform the desired operation associated with the dialer selected by user 8. In particular, IVR traversal application 6 utilizes the ordered sequence of IVR response data of the selected dialer. As shown in FIG. 1, IVR system 10 transmits IVR prompts 14 to computing device 2. For example, the IVR prompts 14 present selectable menu options or request user data. IVR traversal application 6 automatically sends IVR response data 16 in response to the IVR prompts 14 to perform the desired operation. The IVR response data 16 may include a series of responses which are transmitted in response to a series of IVR prompts 14, where the IVR traversal application 6 automatically transmits a response only after receiving a corresponding IVR prompt. A response corresponding to a menu selection is transmitted without the need for the IVR system to output all the menu items, thereby allowing for quicker traversal of the IVR system. IVR response data 16 may include both private information data (also referred to herein as "personal data"), such as a user account number, and public information data, such as menu navigation elements or a flight number.

In one example, IVR response data 16 for a dialer 4 is generated by a person previously calling into the IVR system and mapping the ordered sequence of menu selections to perform a desired operation. Once the ordered sequence of menu selections is identified to perform a desired operation, the sequence is stored in the dialer for later auto-traversal of the IVR system without the need for manual selection. The person mapping the IVR responses may also indicate locations where input of personal data is required.

Figure 2:
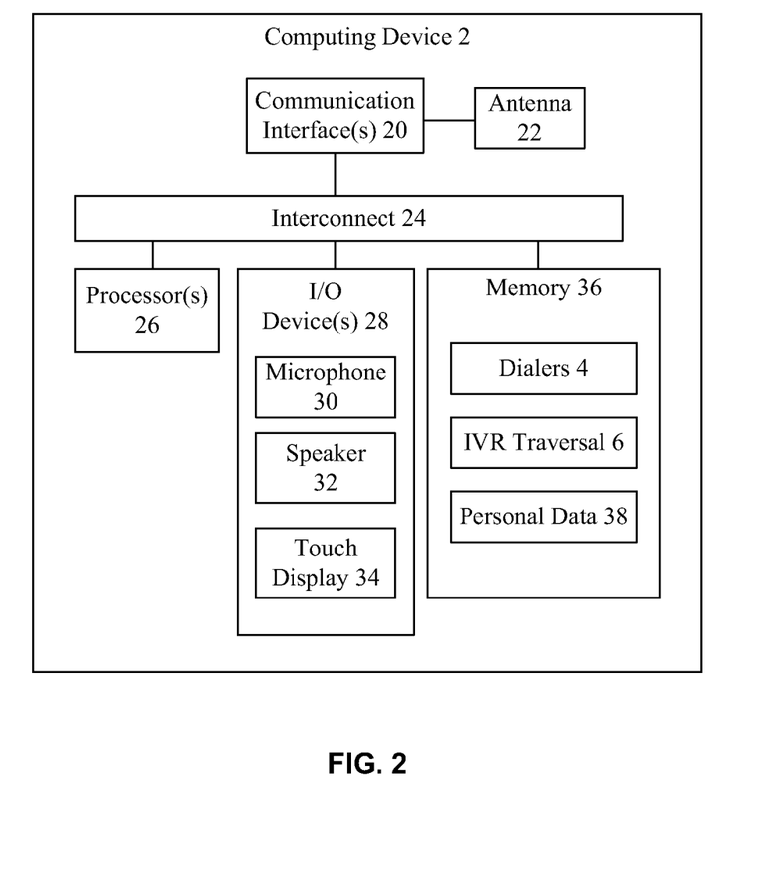
FIG. 2 illustrates a simplified block diagram of the computing device shown in FIG. 1 utilized for auto-traversal of the interactive voice response system.

FIG. 2 illustrates a simplified block diagram of the computing device 2 utilized for auto-traversal of the interactive voice response system shown in FIG. 1. In one example, the computing device 2 includes a two-way RF communication device having data communication capabilities. The computing device 2 has the capability to communicate with other computer systems via a local or wide area network.

Computing device 2 includes input/output (I/O) device(s) 28 configured to interface with the user, including a microphone 30 operable to receive a user voice input and a keypad to receive alphanumeric input. I/O device(s) 28 may include touchscreen display 34 and speaker 32, as well as other I/O devices.

The computing device 2 includes a processor 26 configured to execute code stored in a memory 36. Processor 26 executes IVR traversal application 6 to perform functions described herein. Although shown as a separate application, IVR traversal application 6 may be integrated with other applications residing on computing device 2.

While only a single processor 26 is shown, computing device 2 may include multiple processors and/or co-processors, or one or more processors having multiple cores. The processor 26 and memory 36 may be provided on a single application-specific integrated circuit, or the processor 26 and the memory 36 may be provided in separate integrated circuits or other circuits configured to provide functionality for executing program instructions and storing program instructions and other data, respectively. Memory 36 also may be used to store temporary variables or other intermediate information during execution of instructions by processor 26.

Memory 36 may include both volatile and non-volatile memory such as random access memory (RAM) and read-only memory (ROM). Memory 36 stores dialers 4 and personal data 38 for use by IVR traversal application 6.

Instructions may be provided to memory 36 from a storage device, such as a magnetic device, read-only memory, via a remote connection (e.g., over a network via communication interface(s) 20) that may be either wireless or wired providing access to one or more electronically accessible media. In alternative examples, hard-wired circuitry may be used in place of or in combination with software instructions, and execution of sequences of instructions is not limited to any specific combination of hardware circuitry and software instructions.

Computing device 2 includes communication interface(s) 20, one or more of which may utilize an antenna 22. The communications interface(s) 20 may also include other processing means, such as a digital signal processor and local oscillators. In one example, communications interface(s) 20 include one or more short-range wireless communications subsystems which provide communication between computing device 2 and different systems or devices. For example, the short-range communications subsystem may include a Bluetooth subsystem including a transceiver, or a WiFi subsystem. Interconnect 24 may communicate information between the various components of computing device 2.

Computing device 2 may include operating system code and specific applications code, which may be stored in nonvolatile memory. For example the code may include drivers for the computing device 2 and code for managing the drivers and a protocol stack for communicating with the communications interface(s) 20 which may include a receiver and a transmitter and is connected to an antenna 22.

Communication interface(s) 20 may provide access to a network, such as a local area network. Communication interface(s) 20 may include, for example, a wireless network interface having antenna 22, which may represent one or more antenna(e). In one embodiment, communication interface(s) 20 may provide access to a local area network, for example, by conforming to IEEE 802.11b and/or IEEE 802.11g standards, and/or the wireless network interface may provide access to a personal area network, for example, by conforming to Bluetooth standards. In addition to, or instead of, communication via wireless LAN standards, communication interface(s) 20 may provide wireless communications using, for example, Time Division, Multiple Access (TDMA) protocols, Global System for Mobile Communications (GSM) protocols, Code Division, Multiple Access (CDMA) protocols, and/or any other type of wireless communications protocol.

In various embodiments, the techniques of FIGS. 5-6 discussed below may be implemented as sequences of instructions executed by one or more electronic systems. The instructions may be stored by the computing device 2 or the instructions may be received by the computing device 2 (e.g., via a network connection). Computing device 2 is intended to represent a range of electronic devices, for example, computer systems, tablet computers, smartphones, laptops, PDAs, cellular telephones, etc.

In one example, computing device 2 or subscriber service 18 are operable to create user selectable dialers 4. In one example, the dialers 4 are created by IVR traversal application 6. Dialers 4 include a dial number for an IVR system and an ordered sequence of IVR response data operable to transmit to the IVR system perform a desired operation. In one example, the ordered sequence of IVR response data includes a string of numeric data and time pauses. In one example, the ordered sequence of IVR response data is operable to automatically navigate a series of menus without additional user input at the IVR system to reach a desired IVR system destination. In one example, the user selectable dialer 4 is identified by the desired operation to be performed. For example, the desired operation may be to reach a human operator.

In an embodiment where a user 8 subscribes to a particular dialer from subscriber service 18, the user 8 may receive automatic updates for the dialer. For example, a dialer 4 may be updated with an updated ordered sequence of IVR response data received from subscriber service 18. In this manner, dialers 4 are kept current as the corresponding IVR system changes, such as where the IVR system changes the presented menu options.

In one example, the user selectable dialer 4 is stored in a user browsable database of user contacts. User contacts include advanced user contacts including both a dial number and an ordered sequence of IVR response data operable to transmit to the IVR system to perform a desired operation. In a further example, the user selectable dialers 4 are viewable in a directory listing. In one example, the user contacts or directory listing are stored on the computing device 2. In a further example, the user contacts or directory listing are stored on subscriber service 18 or other remote device, whereby the user can select the dialer on the subscriber service 18 or remote device to initiate dialing and auto-traversal of the desired IVR system.

In one example, the user selectable dialers 4 are composed of both public information data and private information data. In one embodiment, the public information and private information data are both stored in the cloud. In a further embodiment, the public information is stored in the cloud and the private information is stored on the user client device, such as computing device 2.

In operation, computing device 2 receives a user selection of the user selectable dialer 4. IVR traversal application 6 automatically dials the dial number to connect to the IVR system and automatically transmits the ordered sequence of IVR response data to perform the desired operation responsive to receiving the user selection. In one example, the user selection is a single action operable to perform the desired operation. For example, the dialer 4 may be displayed as a selector button on the touch display 34, and the user may simply "tap" the selector button to perform the desired operation. In one embodiment, IVR traversal application 6 requests that the user input a password if the user selects a dialer 4 requiring a password. The IVR traversal application 6 verifies the user password prior to automatically dialing the dial number and automatically transmitting the ordered sequence of IVR response data. For example, one usage scenario requiring heightened security is transferring of funds between accounts. If the user selects a "transfer funds" dialer 4, the user must enter a password which is verified by IVR traversal application 6 prior to executing the "transfer funds" dialer to dial the bank entity.

In one example, creating a user selectable dialer or using the user selectable dialer includes retrieving a user personal data 38 from a user computer memory 36. For example, the user personal data 38 includes a personal identification number, account number, date of birth, phone number, zip code, name, or device language. This retrieved personal data is automatically included in the ordered sequence of IVR response data transmitted to IVR system 10 by IVR traversal application 6. In one example, information may be obtained using other resources on the computing device 2. For example, a current user zipcode may be obtained using a location services application on the computing device 2.

In one example, the ordered sequence of IVR response data includes user interface input data. For example, the user interface input data includes an alphanumeric key input or a voice input. For example, the user interface input data includes a user personal data, such as a personal identification number, account number, date of birth, phone number, zip code, name, or device language. In one example, no user interface input data is required by the dialer.

In a further example, the user need not initiate the dialer to perform the dialer operation. The user may setup an automatically recurring dialer action. For example, the user may setup an automatically recurring dialer action to refill a prescription on a monthly basis, or transfer $50/month to the user checking account. The system may set this recurring event to occur per the user instruction, and only notify the user that it has been completed.

In one example, the IVR traversal application 6 is operable to receive the user interface input data following receiving the user selection of the user selectable dialer 4 and prior to automatically dialing the dial number. IVR traversal application 6 automatically transmits the user interface input data to the IVR system 10 as IVR response data. For example, in one usage application, if the user selects a "transfer funds" dialer 4, the user is prompted to enter a dollar amount prior to dialing the bank entity. IVR traversal application 6 receives the entered dollar amount and incorporates it into the IVR response data to be submitted to the bank entity IVR system. IVR traversal application 6 then dials the number for the bank entity contained in the "transfer funds" dialer 4 and utilizes the prior IVR response data associated with the "transfer funds" dialer 4 and the received dollar amount of the transfer to automatically complete the transfer funds task.

In one example, the IVR traversal application 6 is further operable to record an audio of at least a portion of a connected call with the IVR system. For example, the portion of the connected call recorded is an end segment. In one embodiment, the end segment is a predetermined amount of time at the end of the call. In a further embodiment, the end segment is the portion of the call following transmission of a last IVR response data. In one embodiment, the entire duration of the call is recorded, and only the end segment is clipped and saved in memory 36 as a digital audio file. The IVR traversal application terminates the call following completion of the desired operation. The user can play back the recorded call to confirm completion of the desired operation.

In one example, the IVR traversal application 6 converts a speech in the audio to text using a speech-to-text engine and sends or displays the text to the user. For example, the text may be immediately displayed to the user on touch display 34 and/or sent via email or text message to the user.

In one example, computing device 2, subscriber service 18, or both computing device 2 and subscriber service 18 together, perform operations including receiving a dial number associated with a contact entity utilizing an interactive voice response system. The operations include receiving an ordered sequence of IVR response data operable to transmit to the IVR system perform a desired operation at the contact entity, and creating a user selectable contact entity dialer including the dial number and the ordered sequence of IVR response data. The operations further include receiving a user selection of the user selectable contact entity dialer, and automatically dialing the dial number and automatically utilizing the ordered sequence of IVR response data to interact with the IVR system to perform the desired operation.

Figure 3:
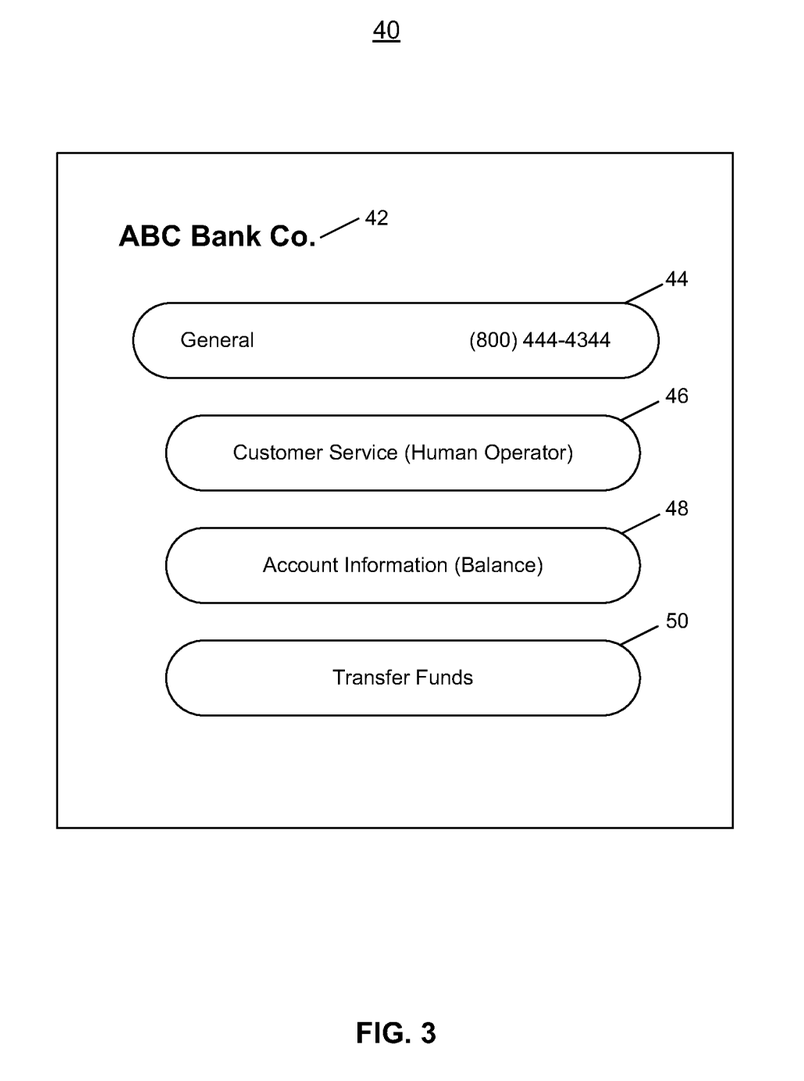
FIG. 3 illustrates an enhanced user contact in one example.

FIG. 3 illustrates an enhanced user contact 40 in one example. In the example shown in FIG. 3, enhanced user contact 40 includes a contact name 42, a selectable dial number 44, and selectable dialer 46, selectable dialer 48, and selectable dialer 50. For example, user contact 40 is displayed on a touch display of a smartphone, and the user may "tap" on the selectable dial number 44, or selectable dialer 46, selectable dialer 48, and selectable dialer 50. Selectable dialer 46, 48, and 50 are example of dialers 4 discussed above which allow the user to automatically perform the desired operations of reaching a human operation, checking an account balance, or transferring funds, respectively.

Figure 4:
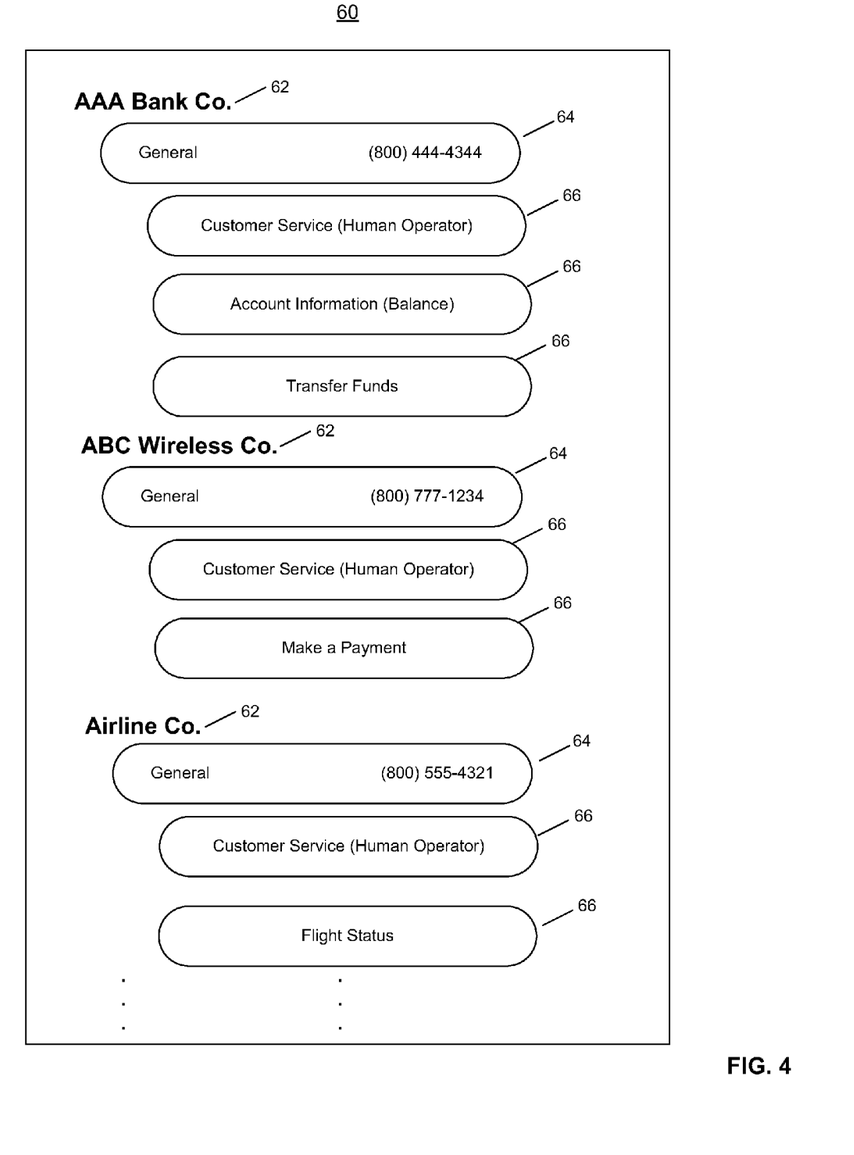
FIG. 4 illustrates an enhanced directory listing in one example.

FIG. 4 illustrates an enhanced directory listing 60 in one example. In the example shown in FIG. 4, directory listing 60 includes a list of entities 62. For example, entities 62 may include any entity operating an IVR system. Each entity 62 may include a regular selectable dial number 64. For example, the regular selectable dial number 64 simply connects to the corresponding IVR system at the starting menu of the IVR system. Each entity may include one or more user selectable dialers 66. Dialers 66 are examples of dialers 4 discussed above. As seen in FIG. 4, the operations performed by each dialer 66 may differ based on the type of entity 62. For example, directory listing 60 is displayed on a touch display of a smartphone, and the user may "tap" on the selectable dial number 64 or selectable dialers 66.

In one example, the user may access dialers via a voice interface rather than via a device display. For example, the user may access an airline dialer configured to reach a human operator by either (1) selecting a dialer shown on a device display, or (2) simply speaking into the device microphone "I want to talk to an operator at American Airlines", whereby the device responsively initiates operation of the corresponding dialer.

Figure 5:
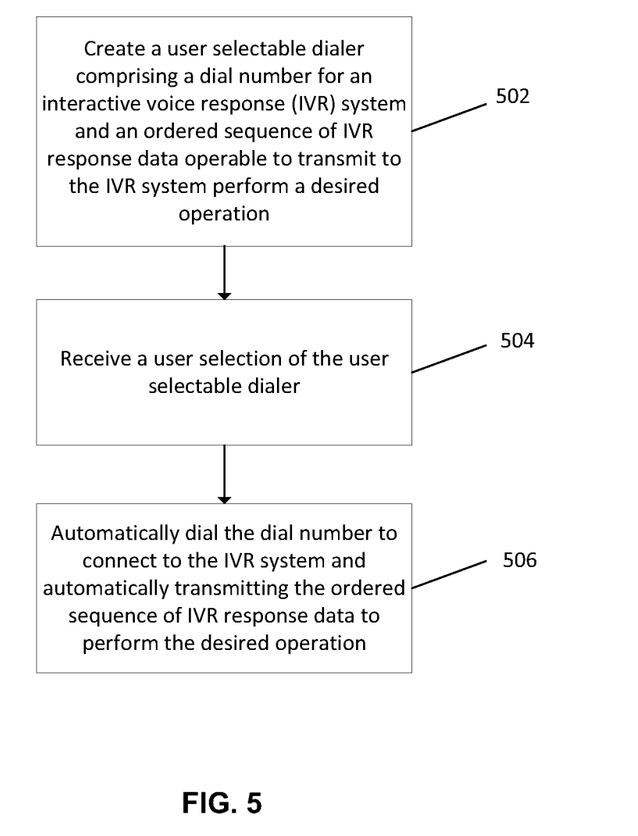
FIG. 5 is a flow diagram illustrating automatic traversal of an interactive voice response system in one example.

FIG. 5 is a flow diagram illustrating automatic traversal of an interactive voice response system in one example. At block 502, a user selectable dialer is created including a dial number for an interactive voice response system and an ordered sequence of IVR response data operable to transmit to the IVR system perform a desired operation. In one example, a user selectable dialer is received from a subscriber service, where the user selectable dialer is created by a third party. In one example, the user selectable dialer is created using crowd-sourcing or at an enterprise. In one example, the ordered sequence of IVR response data includes a string of numeric data and time pauses, audio recordings (e.g. audio recordings of spoken words), or ultrasonic sounds.

In one example, the ordered sequence of IVR response data is operable to automatically navigate a series of menus without additional user input at the IVR system to reach a desired IVR system destination. In one example, the user selectable dialer is stored in a user browsable database of user contacts or in a directory listing.

In one example, creating a user selectable dialer includes retrieving a user personal data from a user computer memory, the ordered sequence of IVR response data comprising the user personal data. In one example, the user personal data is encrypted. For example, the user personal data includes a personal identification number, account number, date of birth, phone number, zip code, name, or device language.

In one example, the ordered sequence of IVR response data includes user interface input data. For example, the user interface input data includes an alphanumeric key input, a voice input, or an ultrasonic frequency inaudible to the human ear defined by a third party IVR. The user interface input data may include a user personal data, such as a personal identification number, account number, date of birth, etc.

In one example, the user selectable dialer is identified by the desired operation to be performed. For example, the desired operation is to reach a human operator. In one example, an updated ordered sequence of IVR response data is received from a remote entity to account for changes at an IVR system.

At block 504, a user selection of the user selectable dialer is received. In one example, the user selection is a single action operable to perform the desired operation. In one example, a user password is received and verified prior to automatically dialing the dial number and automatically transmitting the ordered sequence of IVR response data. In one example, personal data is decrypted prior to automatically dialing the dial number and automatically transmitting the ordered sequence of IVR response data.

At block 506, the dial number is automatically dialed to connect to the IVR system the ordered sequence of IVR response data is automatically transmitted to perform the desired operation responsive to receiving the user selection. In one example, a user interface input data is received following receiving the user selection of the user selectable dialer and prior to automatically dialing the dial number, and automatically transmitting the user interface input data to the IVR system as IVR response data. In one example, the dialing can come from either the device (e.g., a phone) or the cloud. For example, the data is stored locally and assembled for dialing from the phone. In a further example, the data is stored locally and assembled, then transmitted securely for dialing from the cloud into an IVR system. In a further example, all data, personal and public is stored in the cloud, and access to it is granted via the client/device.

In one example, the process further includes recording an IVR system response for later playback to the user. The tones and/or responses are recorded and mapped to known phrases and displayed to the user as a text report, or just played back to the user.

In one example, the process further includes recording an audio of at least a portion of a connected call with the IVR system and playing back the recorded audio to the user automatically or upon user request. For example, the portion of the connected call recorded is an end segment. In one embodiment, the end segment is a predetermined amount of time at the end of the call. In a further embodiment, the end segment is the portion of the call following transmission of a last IVR response data. In one embodiment, the entire duration of the call is recorded, and only the end segment is clipped and saved. In one example, the process further includes terminating the call following completion of the desired operation.

In one example, the process further includes converting a speech in the audio to text and sending or displaying the text to a user. For example, the text may be immediately displayed to the user on a smartphone display and/or sent via email or text message to the user. Advantageously, this enables the user to receive confirmation that the desired operation has been performed without the user needing to listen to the call.

Figure 6:
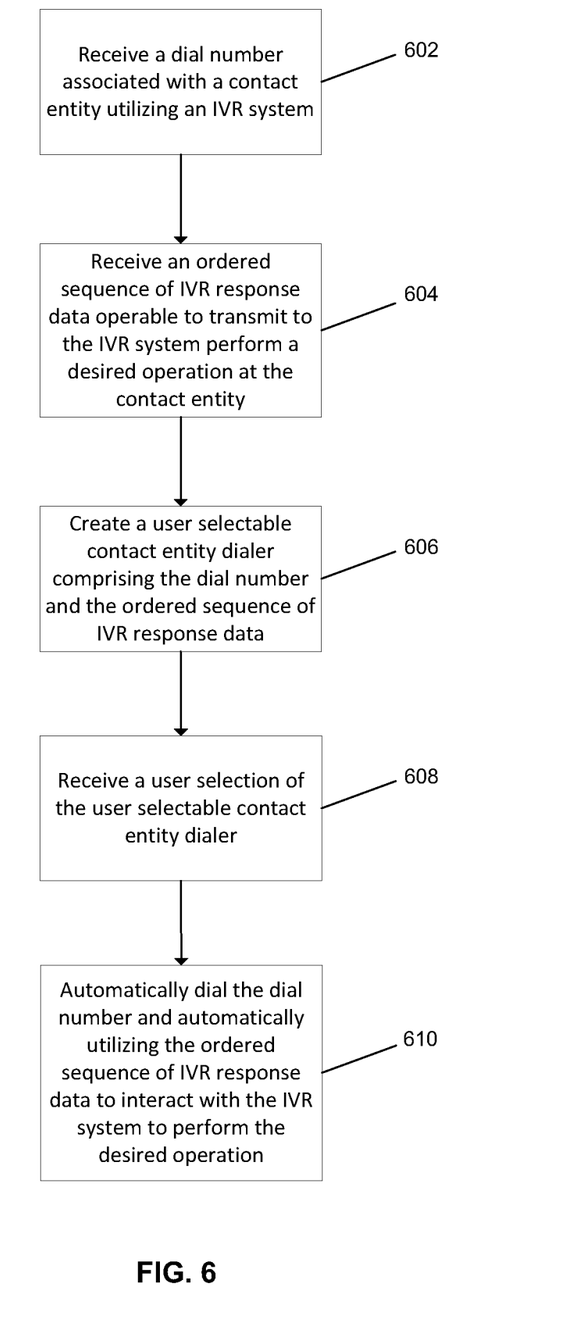
FIG. 6 is a flow diagram illustrating automatic traversal of an interactive voice response system in one example.

FIG. 6 is a flow diagram illustrating automatic traversal of an interactive voice response system in one example. At block 602, a dial number is received associated with a contact entity utilizing an interactive voice response system. In one example, the dial number is a session initiation protocol (SIP) address or other Uniform Resource Identifier (URI).

At block 604, an ordered sequence of IVR response data is received operable to transmit to the IVR system perform a desired operation at the contact entity. In one example, the desired operation is to reach a human operator at the contact entity. In one example, a retrievable file is generated including the ordered sequence of IVR response data.

In one example, the ordered sequence of IVR response data includes a string of numeric data and time pauses. In one example, the ordered sequence of IVR response data is operable to automatically navigate a series of menus without additional user input at the IVR system to reach a desired IVR system destination.

In one example, the ordered sequence of IVR response data includes user interface input data. For example, the user interface input data includes an alphanumeric key input or a voice input. The user interface input data may include user personal data. In one example, the ordered sequence of IVR response data includes data retrieved from a user device.

At block 606, a user selectable contact entity dialer is created including the dial number and the ordered sequence of IVR response data. In one example, the user selectable contact entity dialer is stored in a user browsable database of user contacts.

At block 608, a user selection is received of the user selectable contact entity dialer. In one example, the user selection is a single action operable to perform the desired operation at the contact entity. In one example, user personal data is decrypted.

At block 610, the dial number is automatically dialed and the ordered sequence of IVR response data is automatically utilized to interact with the IVR system to perform the desired operation. In one example, a user password is received and verified prior to automatically dialing the dial number and automatically utilizing the ordered sequence of IVR response data to interact with the IVR system to perform the desired operation. In one example, an updated ordered sequence of IVR response data is received from a remote entity periodically to account for changes at the IVR system.

While the exemplary embodiments of the present invention are described and illustrated herein, it will be appreciated that they are merely illustrative and that modifications can be made to these embodiments without departing from the spirit and scope of the invention. Acts described herein may be computer readable and executable instructions that can be implemented by one or more processors and stored on a computer readable memory or articles. The computer readable and executable instructions may include, for example, application programs, program modules, routines and subroutines, a thread of execution, and the like. In some instances, not all acts may be required to be implemented in a methodology described herein.

Terms such as "component", "module", "circuit", and "system" are intended to encompass software, hardware, or a combination of software and hardware. For example, a system or component may be a process, a process executing on a processor, or a processor. Furthermore, a functionality, component or system may be localized on a single device or distributed across several devices. The described subject matter may be implemented as an apparatus, a method, or article of manufacture using standard programming or engineering techniques to produce software, firmware, hardware, or any combination thereof to control one or more computing devices.

Thus, the scope of the invention is intended to be defined only in terms of the following claims as may be amended, with each claim being expressly incorporated into this Description of Specific Embodiments as an embodiment of the invention.

What is claimed is:

1. One or more non-transitory computer-readable storage media having computer-executable instructions stored thereon which, when executed by one or more computers, cause the one more computers to perform operations comprising:
    creating a user selectable dialer comprising a dial number for an interactive voice response (IVR) system and an ordered sequence of IVR response data operable to transmit to the IVR system to perform a desired operation;
    receiving at a computing device user interface a user selection of the user selectable dialer;
    automatically dialing the dial number with a computing device to connect the computing device to the IVR system and automatically transmitting the ordered sequence of IVR response data to perform the desired operation; and
    receiving a user interface input data following receiving at the computing device user interface the user selection of the user selectable dialer and prior to automatically dialing the dial number with the computing device; and
    automatically transmitting the user interface input data to the IVR system as IVR response data following automatically dialing the dial number with a computing device to connect the computing device to the IVR system.

2. The one or more non-transitory computer-readable storage media of claim 1, wherein creating a user selectable dialer comprises retrieving a user personal data from a user computer memory, the ordered sequence of IVR response data comprising the user personal data.

3. The one or more non-transitory computer-readable storage media of claim 2, wherein the user personal data comprises a personal identification number, account number, date of birth, phone number, zip code, name, or device language.

4. The one or more non-transitory computer-readable storage media of claim 2, wherein the user personal data is encrypted.

5. The one or more non-transitory computer-readable storage media of claim 1, wherein the ordered sequence of IVR response data comprises a user interface input data.

6. The one or more non-transitory computer-readable storage media of claim 5, wherein the user interface input data comprises an alphanumeric key input, a voice input, or an ultrasonic frequency inaudible to the human ear defined by a third party IVR.

7. The one or more non-transitory computer-readable storage media of claim 5, wherein the user interface input data comprises a user personal data.

8. The one or more non-transitory computer-readable storage media of claim 1, wherein the ordered sequence of IVR response data comprises audio recordings, audio recordings of spoken words, or ultrasonic sounds.

9. The one or more non-transitory computer-readable storage media of claim 1, wherein the user selectable dialer is identified by the desired operation to be performed.

10. The one or more non-transitory computer-readable storage media of claim 1, wherein the desired operation is to reach a human operator.

11. The one or more non-transitory computer-readable storage media of claim 1, wherein the user selection is a single action operable to perform the desired operation.

12. The one or more non-transitory computer-readable storage media of claim 1, wherein the operations further comprise receiving and verifying a user password prior to automatically dialing the dial number and automatically transmitting the ordered sequence of IVR response data.

13. The one or more non-transitory computer-readable storage media of claim 1, wherein the operations further comprise decrypting a personal data prior to automatically dialing the dial number and automatically transmitting the ordered sequence of IVR response data.

14. The one or more non-transitory computer-readable storage media of claim 1, wherein the operations further comprise: recording an audio of at least a portion of a connected call with the IVR system.

15. The one or more non-transitory computer-readable storage media of claim 14, wherein the portion of the connected call is an end segment and the operations further comprise playing the recorded audio to a user.

16. The one or more non-transitory computer-readable storage media of claim 14, wherein the operations further comprise: converting a speech in the audio to text and sending or displaying the text to a user.

17. One or more non-transitory computer-readable storage media having computer-executable instructions stored thereon which, when executed by one or more computers, cause the one more computers to perform operations comprising:
receiving a dial number associated with a contact entity utilizing an interactive voice response (IVR) system;
receiving an ordered sequence of IVR response data operable to transmit to the IVR system perform a desired operation at the contact entity;
creating a user selectable contact entity dialer comprising the dial number and the ordered sequence of IVR response data;
receiving at a computing device user interface a user selection of the user selectable contact entity dialer;
automatically dialing the dial number with a computing device and automatically utilizing the ordered sequence of IVR response data to interact with the IVR system to perform the desired operation; and
receiving a user interface input data following receiving at the computing device user interface the user selection of the user selectable contact entity dialer and prior to automatically dialing the dial number with the computing device; and
automatically transmitting the user interface input data to the IVR system as IVR response data following automatically dialing the dial number with a computing device to connect the computing device to the IVR system.

18. The one or more non-transitory computer-readable storage media of claim 17, wherein the desired operation is to reach a human operator at the contact entity.

19. The one or more non-transitory computer-readable storage media of claim 17, wherein the operations further comprise generating a retrievable file comprising the ordered sequence of IVR response data.

20. The one or more non-transitory computer-readable storage media of claim 17, wherein the user selection is a single action operable to perform the desired operation at the contact entity.

21. The one or more non-transitory computer-readable storage media of claim 17, wherein the dial number comprises a session initiation protocol (SIP) address or other Uniform Resource Identifier (URI).

22. The one or more non-transitory computer-readable storage media of claim 17, further comprising decrypting a personal data.

23. A method comprising:
creating a user selectable dialer comprising a dial number for an interactive voice response (IVR) system and an IVR response data operable to transmit to the IVR system perform a desired operation;
receiving at a computing device user interface a user selection of the user selectable dialer;
automatically dialing the dial number with a computing device to connect the computing device to the IVR system and automatically transmitting the IVR response data to perform the desired operation; and
receiving a user interface input data following receiving at the computing device user interface the user selection of the user selectable dialer and prior to automatically dialing the dial number with a computing device to connect the computing device to the IVR system; and
automatically transmitting the user interface input data to the IVR system as IVR response data following automatically dialing the dial number with a computing device to connect the computing device to the IVR system.

24. The method of claim 23, wherein the operations further comprise receiving an updated IVR response data from a remote entity.

25. The method of claim 23, wherein the operations further comprise storing the user selectable dialer in a user browsable database of user contacts.

26. The method of claim 23, wherein the IVR response data is operable to automatically navigate a series of menus without additional user input at the IVR system to reach a desired IVR system destination.

27. The method of claim 23, further comprising receiving a user selectable dialer from a subscriber service, wherein the user selectable dialer is created by a third party.

28. The method of claim 23, wherein the user selectable dialer is created using crowd-sourcing or at an enterprise.

29. The method of claim 23, further comprising recording an IVR system response and outputting the IVR system response to a user.

* * * * *